(12) United States Patent
Kent et al.

(10) Patent No.: US 10,750,736 B2
(45) Date of Patent: *Aug. 25, 2020

(54) ROBOTIC ELECTRICALLY POWERED INFRARED BASED THERMAL WEED CONTROL SYSTEM

(71) Applicant: STW, LLC, Eustis, FL (US)

(72) Inventors: Hugh C. Kent, Eustis, FL (US); Michael Reischmann, Eustis, FL (US)

(73) Assignee: STW, LLC, Eustis, FL (US)

( * ) Notice: Subject to any disclaimer, the term of this patent is extended or adjusted under 35 U.S.C. 154(b) by 263 days.

This patent is subject to a terminal disclaimer.

(21) Appl. No.: 15/995,807

(22) Filed: Jun. 1, 2018

(65) Prior Publication Data

US 2018/0271082 A1 Sep. 27, 2018

Related U.S. Application Data

(63) Continuation of application No. 15/490,360, filed on Apr. 18, 2017, now Pat. No. 10,010,067, which is a continuation-in-part of application No. 14/850,077, filed on Sep. 10, 2015, now Pat. No. 9,648,864.

(60) Provisional application No. 62/049,921, filed on Sep. 12, 2014.

(51) Int. Cl.
*A01M 21/04* (2006.01)
*H05B 3/00* (2006.01)

(52) U.S. Cl.
CPC ........... *A01M 21/04* (2013.01); *H05B 3/0033* (2013.01)

(58) Field of Classification Search
CPC .. A01M 21/04; A01M 21/046; A01M 21/043; A01M 21/00
See application file for complete search history.

(56) References Cited

U.S. PATENT DOCUMENTS

| 3,627,989 A | 12/1971 | Heidler et al. |
| 5,189,832 A | 3/1993 | Hoek et al. |
| 5,252,809 A | 10/1993 | Demin |
| 5,793,035 A | 8/1998 | Beck et al. |
| 5,915,072 A | 6/1999 | Campbell et al. |
| 6,037,572 A | 3/2000 | Coates et al. |
| 6,245,010 B1 | 6/2001 | Jones |
| 6,795,568 B1 | 9/2004 | Christensen et al. |

(Continued)

FOREIGN PATENT DOCUMENTS

KR    10-2015-0113536 A    10/2015

OTHER PUBLICATIONS

International Search Report and Written Opinion from corresponding International Application No. PCT/US2018/027975, dated Jul. 26, 2018.

(Continued)

*Primary Examiner* — Monica L Barlow
(74) *Attorney, Agent, or Firm* — Brian B. Shaw, Esq.; Harter Secrest & Emery LLP

(57) ABSTRACT

An electrically powered infrared based thermal weed control system. A housing has a downwardly facing chamber. At least one electrically powered infrared heating element is mounted within the chamber. A source of electrical power is electrically coupled to the electrically powered infrared heating element. A control assembly varies the electrical power to the electrically powered infrared heating elements and the heat generated for controlling undesired vegetation there adjacent using targeted infrared radiation emitted by the electrically powered infrared heating element.

16 Claims, 9 Drawing Sheets

(56) References Cited

U.S. PATENT DOCUMENTS

| | | |
|---|---|---|
| 7,595,464 B2 | 9/2009 | Konishi |
| 8,872,136 B1 | 10/2014 | Jackson et al. |
| 2001/0000554 A1 | 5/2001 | Prull |
| 2005/0167414 A1 | 8/2005 | Kuo et al. |
| 2010/0024291 A1 | 2/2010 | Jensen |
| 2013/0235183 A1 | 9/2013 | Redden |
| 2015/0075066 A1 | 3/2015 | Stowe |
| 2015/0313090 A1 | 11/2015 | Weiss et al. |
| 2016/0205918 A1 | 7/2016 | Chan et al. |

OTHER PUBLICATIONS

EGO Products. "Thick Film Ceramic Heating Element" accessed on Sep. 14, 2018 via http://www.egoproducts.com/en/products/appliance-heating/thick-film-technology/ceramic-heating-elements/.

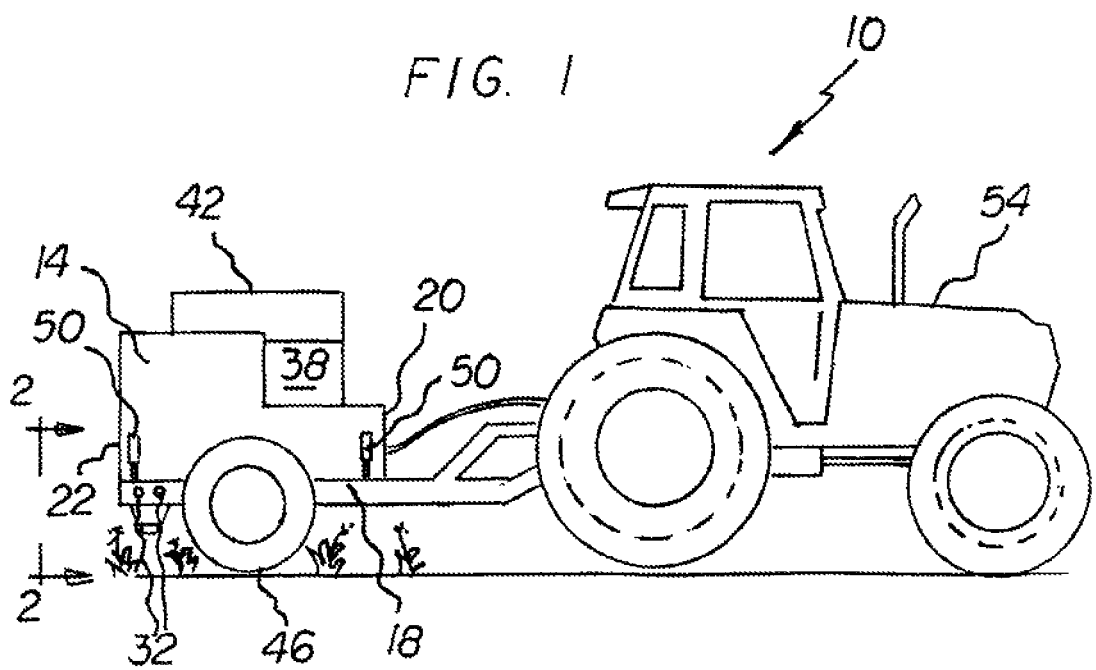
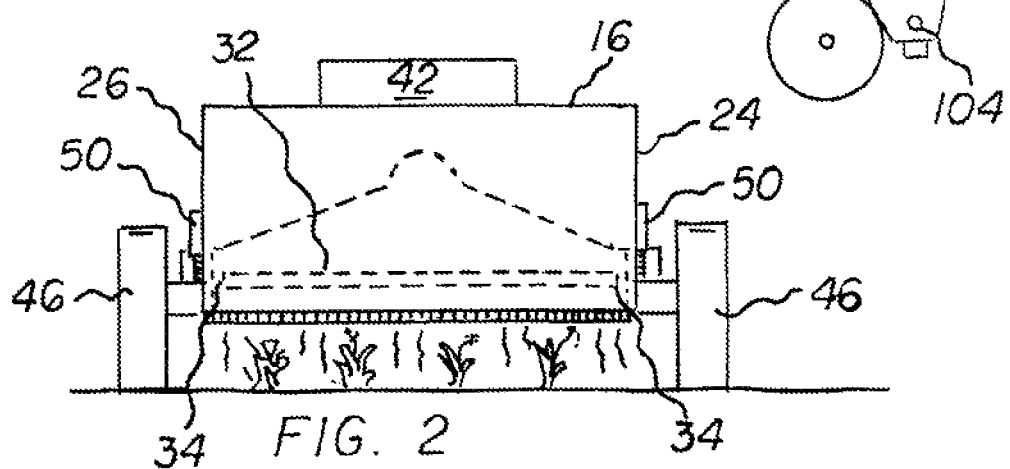

FIG. 10
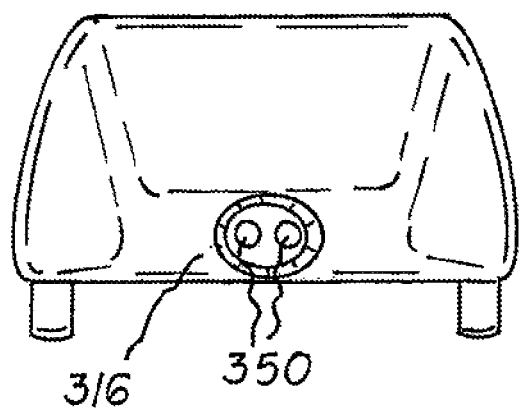
316  350
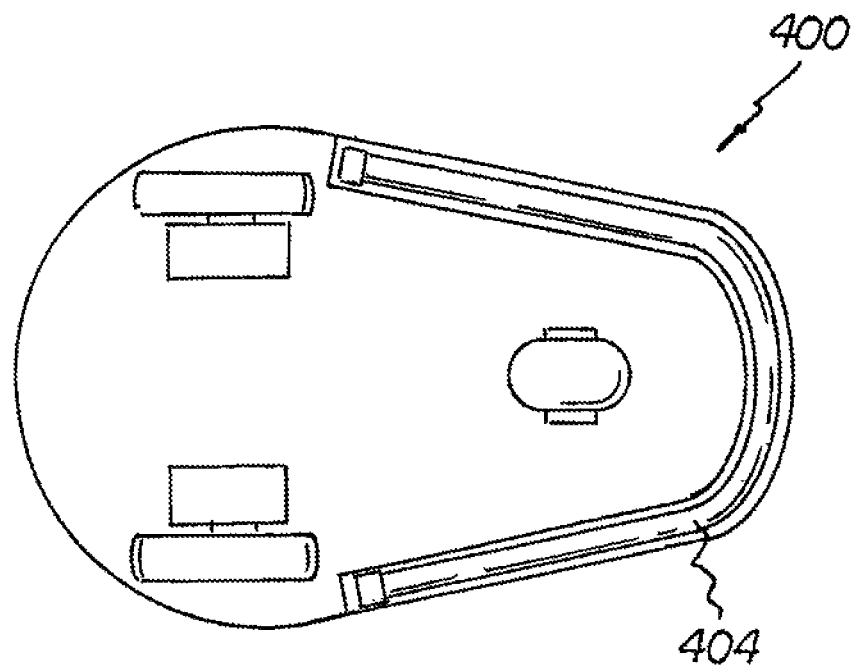
400
404
FIG. 11

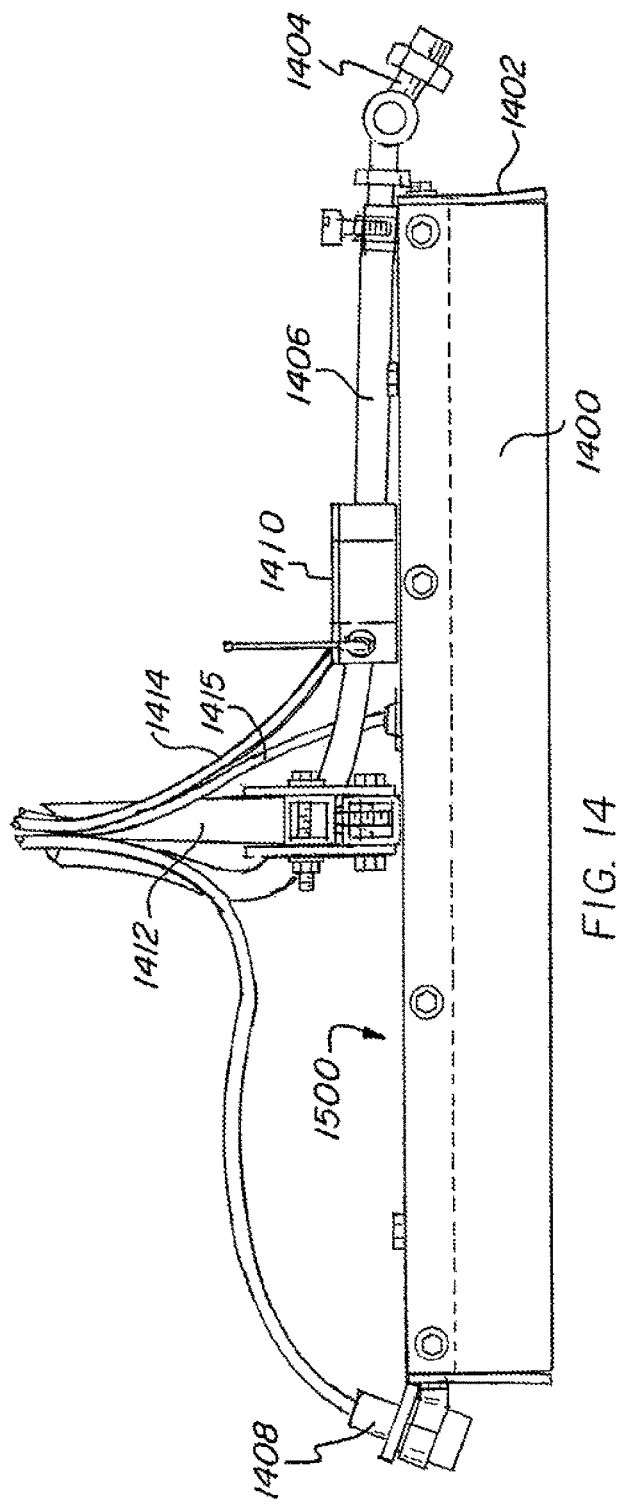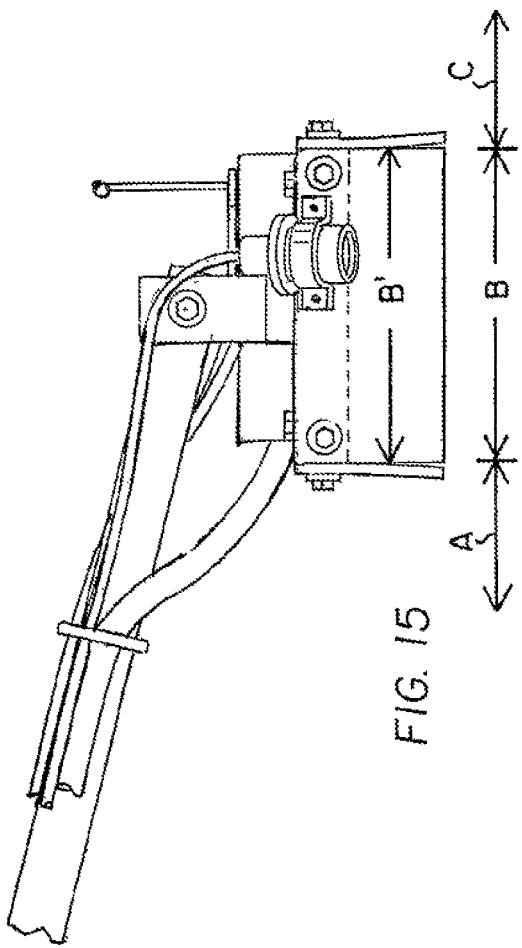

ROBOTIC ELECTRICALLY POWERED INFRARED BASED THERMAL WEED CONTROL SYSTEM

FIELD OF THE INVENTION

The present invention relates to an electrically powered infrared based thermal weed control system and more particularly pertains to heating weeds to an appropriate temperature and for an appropriate time sufficient to control weeds in a safe, ecological, convenient, and economical manner.

BACKGROUND OF THE INVENTION

The use of weed control systems of known designs and configurations is known in the prior art. More specifically, weed control systems of known designs and configurations previously devised and utilized for the purpose of controlling weeds are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe electrically powered infrared based thermal weed control system that allows heating weeds to an appropriate temperature and for an appropriate time sufficient to control weeds in a safe, ecological, convenient, and economical manner. In this respect, the electrically powered infrared based thermal weed control system according to the present invention substantially departs from the conventional concepts and designs of the prior art, and in doing so provides an apparatus primarily developed for the purpose of heating weeds to an appropriate temperature and for an appropriate time sufficient to control weeds in a safe, ecological, convenient, and economical manner.

Although open flame combustion based systems exist, these are very dangerous and hard to control and will not effectively control weeds in a large number of crop fields as such systems would ultimately damage or kill the desired crops. Therefore, it can be appreciated that there exists a continuing need for a new and improved electrically powered infrared based thermal weed control system which can be used for heating weeds to an appropriate temperature and for an appropriate time sufficient to control weeds in a safe, ecological, convenient, and economical manner. In this regard, the present invention substantially fulfills this need.

SUMMARY OF THE INVENTION

In view of the foregoing disadvantages inherent in the known types of weed control systems of known designs and configurations now present in the prior art, the present invention provides an improved electrically powered infrared based thermal weed control system. As such, the general purpose of the present invention, which will be described subsequently in greater detail, is to provide a new and improved, electrically powered, infrared based thermal weed control system and method which has all the advantages of the prior art and none of the disadvantages. To attain this, from a broad perspective, the present invention is an electrically powered infrared based thermal weed control system having a housing with a downwardly facing chamber, at least one electrically powered infrared heating element mounted within the chamber, a source of electrical potential electrically coupled to the electrically powered infrared heating element, and a control assembly for varying the electrical potential to the electrically powered infrared heating elements and the heat generated for controlling undesired weeds there adjacent.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

it is therefore an object of the present invention to provide a new and improved electrically powered infrared based thermal weed control system which has all of the advantages of the prior art weed control systems of known designs and configurations and none of the disadvantages. It is another object of the present invention to provide a new and improved electrically powered infrared based thermal weed control system which may be easily and efficiently manufactured and marketed. It is a further object of the present invention to provide a new and improved electrically powered infrared based thermal weed control system which is of durable and reliable construction. An even further object of the present invention is to provide a new and improved electrically powered infrared based thermal weed control system which is susceptible of a low cost of manufacture with regard to both materials and labor, and which accordingly is then susceptible of low prices of sale to the consuming public, thereby making such electrically powered infrared based thermal weed control system economically available to the buying public.

Lastly, it is still another object of the present invention is to provide an electrically powered infrared based thermal weed control system for heating weeds to an appropriate temperature and for an appropriate time sufficient to control weeds in a safe, ecological, convenient, and economical manner. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Prior art combustion generated infrared is intense, but extremely difficult to focus and control. By comparison, the inventors have discovered that electrically generated infrared is extremely precise, focused and controllable when used in treating weeds and undesirable vegetation. In many applications, it does not need to rely on shields or barriers in an attempt to isolate the desirable plants (crops) from the undesirable plants (weeds). Electrically generated infrared allows for effective thermal weed control in applications where the crops are smaller, more delicate and heat sensitive, and where the weeds are in close proximity to the crops. As described in the experimental results herein, this makes electrically generated infrared far superior to combustion generated infrared for virtually all specialty and row crops (such as fruits, vegetables and horticultural/nursery crops). In short, the experimentation and prototyping described herein and the discovery of the inventors shows that electrically generated infrared is suitable for thermal weed control in whole categories of agricultural crops where combustion generated infrared is impractical or impossible. Furthermore, what is unexpected and what was discovered in testing is that the electrically generated infrared emitters described herein create virtually a straight path of treatment that allows for precise targeting of weeds.

BRIEF DESCRIPTION OF THE DRAWINGS

The invention will be better understood and objects other than those set forth above will become apparent when consideration is given to the following detailed description thereof. Such description makes reference to the annexed drawings.

FIG. 1 is a side elevational view of an electrically powered infrared based thermal weed control system constructed in accordance with the principles of the present invention.

FIG. 2 is a front elevational view of the electrically powered infrared based thermal weed control system taken along line 2-2 of FIG. 1.

FIG. 3 is side elevational view of an electrically powered infrared based thermal weed control system constructed in accordance with an alternate embodiment of the invention.

FIG. 10 is a front elevational view along line 10-10 of FIG. 6

FIG. 11 is a bottom view of another alternate embodiment of the invention

FIG. 14 is a side view of an electrically powered weed control system of FIG. 5.

FIG. 15 is a rear view of FIG. 14.

The same reference numerals refer to the same parts throughout the various Figures.

DETAILED DESCRIPTION OF THE INVENTION

Figure 4:
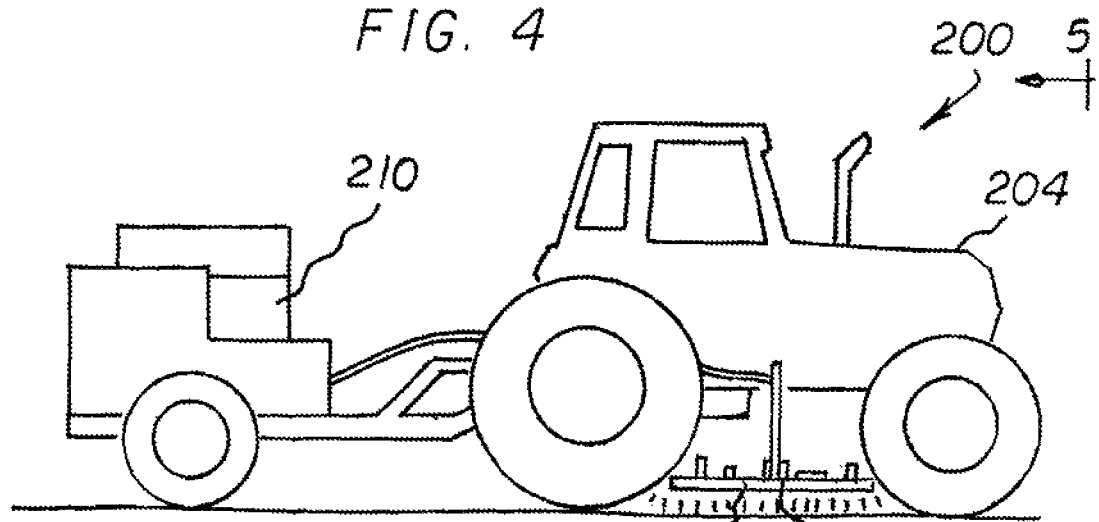
FIG. 4 is a perspective illustration of another alternate embodiment of the invention.

Combustion based weed control devices have an inherent disadvantage in that they are unable to be controlled precisely in terms of the crop areas that are targeted. In all known propane based systems, there is a considerable risk of drift either due to convection or winds or combinations thereof. For this reason, most existing combustion based weed control devices are limited in terms of viable times of day to operate. Typically, many are operated at night when winds are lowest. Furthermore, many of these combustion based devices necessarily need high temperature heat shields to even attempt to contain the heat generated by the combustion. In many cases, the heat shields will actually act as emitters themselves; radiating heat outwardly towards the desirable crop plants, causing un-intended damage.

However, electrically powered infrared represents a drastic departure from these devices in that there is considerable precision in targeting provided by the electric infrared elements. Particularly, the electric (as opposed to combustion based) infrared elements operate much like a flashlight in the sense that the path of area affected is reliably precise. Particularly, the inventors hereto have conducted experimental testing using both propane based weed control systems, and also prototypes of the instant invention; and provide a narrative of the testing and results herein.

Experiment 1—Propane test. In this test, a propane powered thermal weed control system was pulled by a vehicle. The system involved a propane tank coupled to hoses that fed flame torches. On either side of each flame source, there were metal plates whose intention was to isolate the flame's impact. The power of the flame was controllable via a valve system. The propane was turned on and the flame was lit manually. Controlling the valve system proved very difficult since each time the valve was turned down too far, the propane needed to be re-lit, otherwise there would be a source leaking propane into the air, which could spontaneously combust once in contact with the other flame sources.

The apparatus was pulled across an open field (and later crops), and it immediately became apparent that the combustion based system was both very difficult to control and extremely dangerous. For safety, a second vehicle had to follow, at a distance, with a fire extinguisher. The heat generated by the propane combustion was so difficult to control that, more often than not, fire extinguishers were necessary to put out fires created by the open flame. Had valuable cash crops been located adjacent to the flame source, there would have been significant risk that fires on the undesirable weeds would have reached the valuable crops if not for the fire extinguisher, which would be impractical to use in actual operations. More significantly, even absent combustion of the crop plants, air currents (from ambient winds as well as convective wind created by the combustion itself) moved the heat in an unpredictable and uncontrollable fashion, and even shields could not adequately protect crop plants.

Therefore, the test showed that combustion based thermal weed control was impractical in many applications, particularly those with relatively sensitive crops. Furthermore, the risks of unintended combustion and uncontrollable heat showed that the propane combustion based thermal weed controller lacked precision in targeting. Additionally, the metal plates on either side of the flame source (intended to contain the heat) would themselves become very hot over time. As these steel plates heated up, they became emitters of heat in the outward direction. With crops arranged in rows, the steel plates transferred heat to the desirable plants. Therefore, even if the desirable plants did not catch on fire, they would become seriously damaged from the collateral heat emitted outwardly by the plates. Finally, the flame sources did not provide sufficiently uniform heat, such that certain weeds were burned whereas others were not. This meant that in some cases, weeds found between the flame sources may not be at all affected, thus requiring multiple passes.

All of the above observations proved that combustion based weed control was not practical, and was ineffective at providing precision targeting of the undesirable weeds while allowing the desirable crop plants to remain unharmed.

Experiment 2—Electrical Infrared test. In view of the foregoing disadvantages discovered as to typical combustion based heaters, a test was conducted using a prototype electrically powered infrared weed control system. The electrical infrared emitter performed much like a flashlight in terms of targeting, with the emitter producing invisible infrared radiation, much in the way that a flashlight provides visible light. Particularly, the infrared emitter was located in a downward facing chamber and connected to an electrical power source via electrical switches and controls. In this experiment, the power source was a conventional generator that can be found in most home improvement stores. The generator was pulled behind a tractor and the housing was mounted on a movable arm off of the tractor, which allowed for adjustment of vertical position. An electrical controller allowed for electric power to the emitter to be adjusted. There was no flame or combustion or fuel whatsoever (other than the gasoline in the generator). The tractor was driven along a straight path and a hand held laser temperature sensor was used to determine where the infrared radiation was generating heat. The temperature readings immediately under the emitter showed that the ground and weeds were being heated whereas the heat outside the footprint of the emitter was found to be virtually unchanged from ambient ground temperature. The damage to the weeds created by this prototype was not immediately apparent to the eye. However, a day or two later, the path of the prototype's emitter (and its efficacy) was observable and dramatic. It had created a distinct path of dead weeds corresponding to the path of travel, with virtually no effect on plants outside that path.

The test beds created for these trials were planted with delicate wildflowers (*cosmos bipinnatus*) as a test "crop" to represent desirable agricultural plants. Significantly, these delicate wildflowers (even those immediately adjacent to the path of the emitter) were completely un-harmed. Perhaps even more impressive was that, a few weeks later, the path of travel that had been treated with infrared was still almost entirely devoid of live vegetation, whereas the un-treated plants had grown an inch or two at the normal pace of expected growth. Particularly, the area in the field a few feet away from the test beds had grown about the same amount as the "control" strips of un-treated plants; proving that the electrical powered infrared emitters provided precision weed control in the intended areas, while having no impact on the un-treated areas.

These field trials demonstrated the unique ability of an electrically powered infrared emitter to provide precision targeting of plants; not possible to achieve with combustion based weed heaters. The electric infrared also displayed other remarkable, and unexpected, effects. Weeks after the initial treatment, the treated area remained almost completely bare (while the un-treated areas were still un-affected). Normally, new weeds would be expected to generate in the treated area within a short period of time. However, a pre-emergent effect on new weed seeds was observed and new weed generation was delayed far beyond expectations. Here again, the electrically powered prototypes proved far more effective than combustion based weed control methods.

With reference now to the drawings, and in particular to FIG. 1 thereof, the preferred embodiment of the new and improved electrically powered infrared based thermal weed control system embodying the principles and concepts of the present invention and generally designated by the reference numeral 10 will be described.

The present invention, the electrically powered infrared based thermal weed control system 10 is comprised of a plurality of components. Such components in their broadest context include a housing, at least one electrically powered infrared heating element, and a source of electrical potential. Such components are individually configured and correlated with respect to each other so as to attain the desired objective.

In the primary embodiment of the invention, first provided is a housing having a downwardly facing chamber.

Next provided is a plurality of spaced electrically powered infrared heating elements mounted within the chamber. In other embodiments, a single element such as a quartz infrared tube may be used.

Next provided is a source of electrical potential electrically coupled to the electrically powered infrared heating element.

Figure 5:
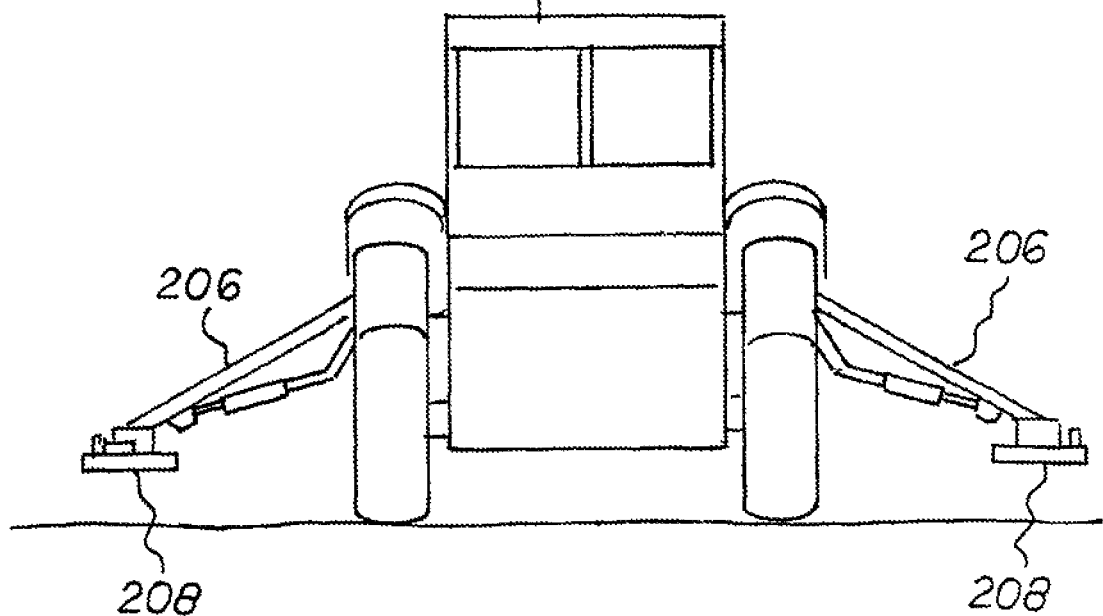
FIG. 5 is a front elevational view of the alternate embodiment of the invention shown in FIG. 4.
Figure 6:
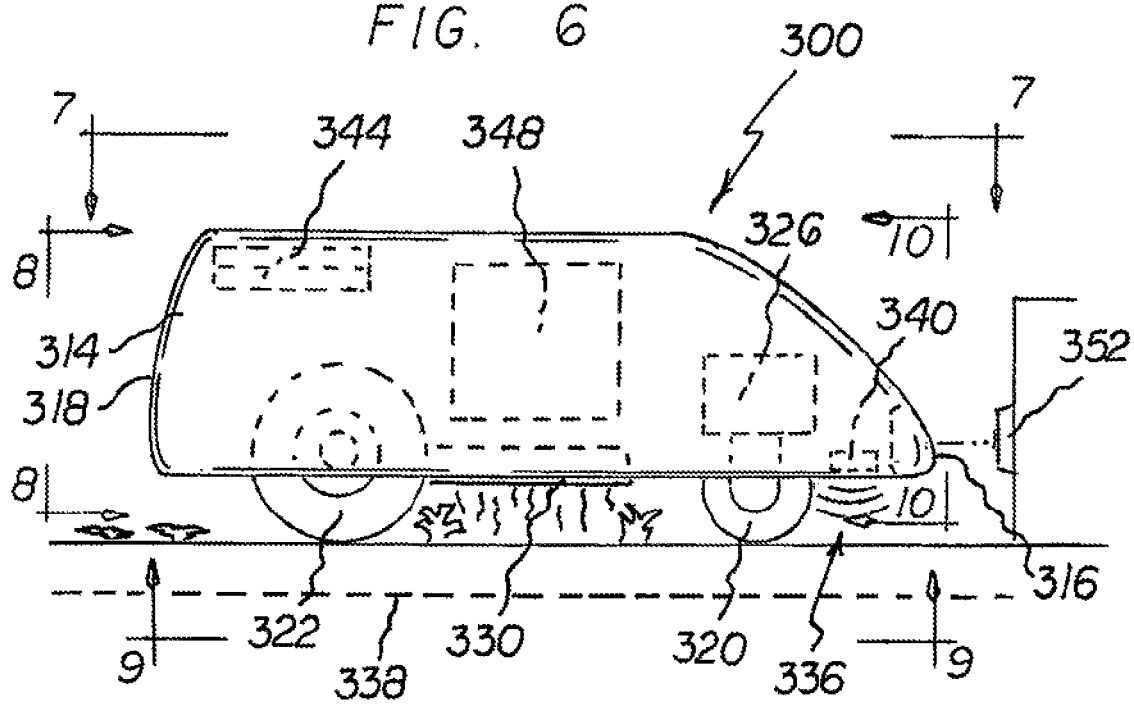
FIG. 6 is a side elevational view of a weed control system of FIG. 1 implemented with a robot.
Figure 7:
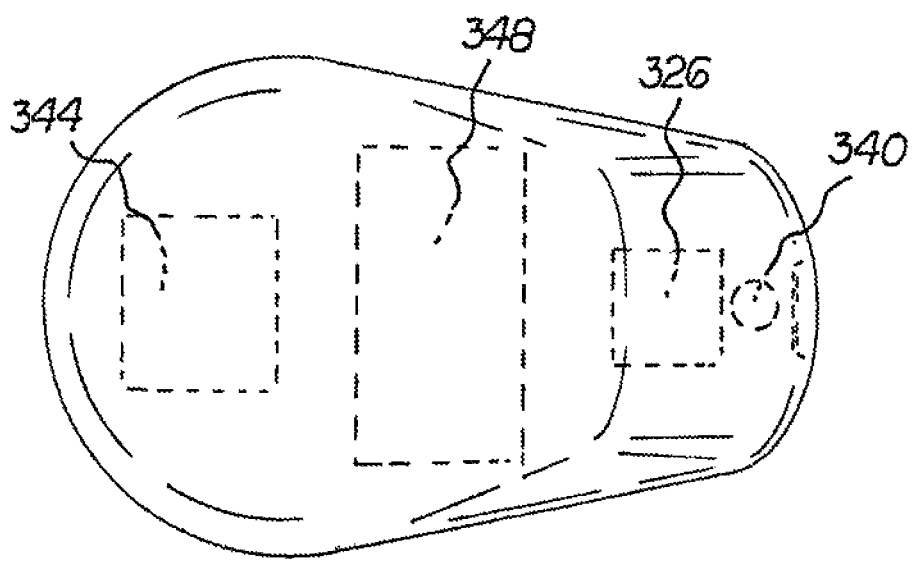
FIG. 7 is a plan view along line 7-7 of FIG. 6
Figure 8:
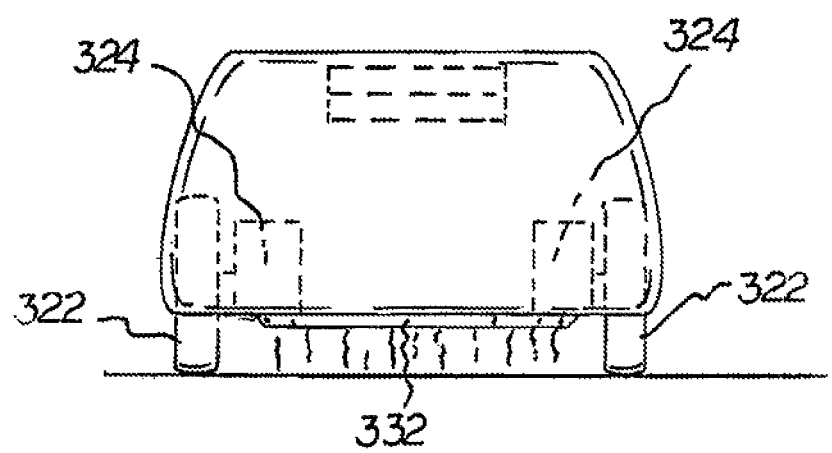
FIG. 8 is a rear elevational view along line 8-8 of FIG. 6
Figure 9:
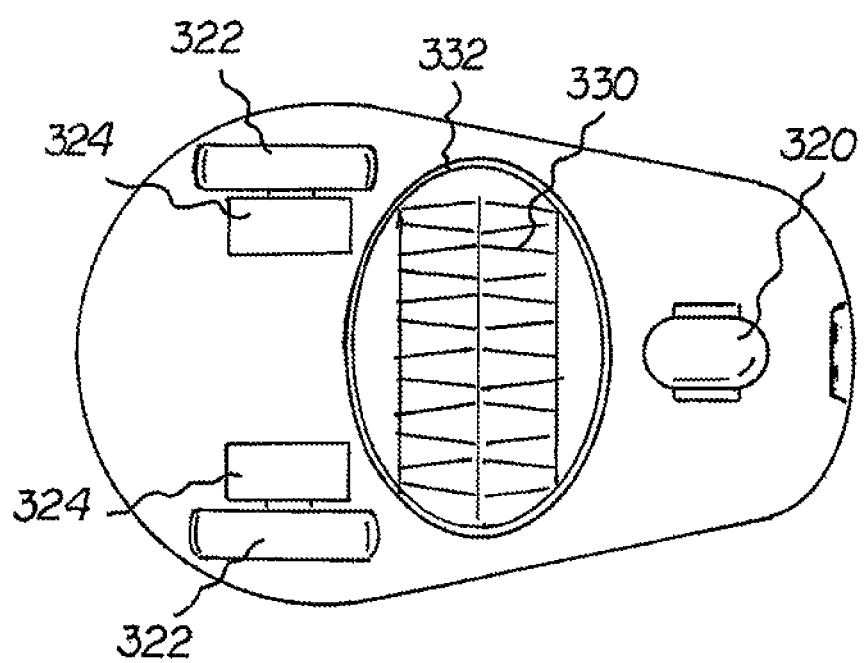
FIG. 9 is a bottom view taken along line 9 of FIG. 6

Next provided is a control assembly for varying the electrical potential to the electrically powered infrared heating elements and the heat generated for controlling undesired weeds there adjacent. The primary embodiment further includes a vehicle for moving the housing, electrically powered infrared heating elements, and source of electrical potential across desired crops and undesired weeds for controlling the undesired weeds but not the desired crops. Although the primary embodiment of FIGS. 1 and 2 illustrates a single towing vehicle with a single towed housing for the electrically powered infrared heating elements, it should be understood that the invention may include a single towing vehicle with multiple laterally spaced wings, or other configuration suitable for different crops, crop row spacing, and their horticultural variations. In the case of laterally offset wings, each wing would include one or more electrically powered infrared heating elements whereby driving between parallel rows of crops would simultaneously remediate two or more rows of crops. Note FIGS. 4 and 5.

An alternate embodiment of the system 100 is illustrated in FIG. 3. In this embodiment a single electrically powered infrared heating element 104 is utilized and handles 108 are provided. The handles are adapted to be gripped by a user to push the electrically powered infrared heating element above undesired weeds for controlling the weeds. This embodiment is best suited for use as a weed control device in areas where there are no crops, i.e., a homeowners driveway or yard. Electrical power in this embodiment is supplied to the system by any of a plurality of means including an extension cord, a battery, a generator, or the like.

In still another embodiment of the invention, the system 200 includes a tractor 204 and two laterally spaced wings 206. The wings are similarly configured. Each wing includes a downwardly facing infrared heating element 208 and a source of potential 210 to power the infrared heating elements. Note FIGS. 4 and 5.

In the preferred embodiment, from a specific perspective, the present invention is an electrically powered infrared based thermal weed control system 10 for heating weeds to an appropriate temperature and for an appropriate time sufficient to control weeds. The heating and the controlling are done in a safe, ecological, convenient, and economical manner.

In this preferred embodiment, illustrated in FIGS. 1 and 2, first provided is a housing 14. The housing is in a rectilinear configuration with a closed top face 16 and an open bottom 18. The housing has a front face 20 and a parallel rear face 22. The housing has a first side face 24 and a parallel second side face 26. A chamber is formed between the closed top face and the open bottom, between the front face and the rear face, and between the first side face and second side face. Next, a plurality of electrically powered infrared heating elements 32 are provided. The electrically powered infrared heating elements are located within the chamber. The electrically powered infrared heating elements have opposed ends 34 coupled to the first side face and the second side face whereby the electrically powered infrared heating elements extend parallel with the front face and the rear face. As an alternative, quartz infrared tube(s) may be used in the place of infrared heating elements.

An electrical power source 38 is next provided. The electric power source is attached to the housing. The electrical power source is operatively coupled to the electrically powered infrared heating elements for providing electrical potential to the electrically powered infrared heating elements for generating heat there adjacent. The heat absorbed by the target object, weed tissue, is sufficient to raise its temperature to at least 100 degrees centigrade.

Next provided is a control assembly 42. The control assembly is under the control of an operator for varying the electrical potential to the electrically powered infrared heating elements so as to vary heat generated for controlling weeds there adjacent.

Although the primary embodiment uses no wheels coupled to the housing, a plurality of wheels 46 may be provided. If provided, the wheels are coupled to and depend downwardly from the housing to facilitate movement of the housing containing the electrically powered infrared heating elements. Wheels may be used in combination with other methods of suspending the housing and enabling its movement, such as a tractor's three-point hitch.

Next provided are height adjustment mechanisms 50. The height adjustment mechanisms are used to vary the elevation of the electrically powered infrared heating elements with respect to the weeds to be controlled.

Lastly, a vehicle 54 is provided. The vehicle is operatively coupled to the housing to pull the housing and the electrically powered infrared heating elements, and source of electrical potential across a field of desirable crops and undesirable weeds. The pulling is done at a speed sufficient to deliver enough infrared radiation to rupture cell walls and interrupt photosynthesis in the undesired weeds to thereby control the undesired weeds. The speed in one example may be between 1 mile per hour and 10 miles per hour.

The control assembly is adapted to be modified so as to automatically adjust the electrically powered infrared heating elements to the angle and height as a function of the crop base for the particular application.

According to the USDA, organic agriculture is a $35 billion retail market in the United States alone, and it has grown at a double digit rate in each year over the last decade. Worldwide, organic agriculture is practiced on approximately 100 million acres.

The most problematic issue facing organic agriculture is weed control. Weeds compete with crops for water and nutrition, and can profoundly reduce crop yields; to the point where crops lose their economic viability. Herbicides (a sub-set of pesticides that control weeds) are, with few exceptions, synthetically derived, toxic, and strictly prohibited for use in organic agriculture by the USDA. Use of prohibited herbicides will disqualify any user from marketing its produce as organic and will subject the user to forfeit organic certification.

The USDA's organic regulations do, however, allow for the use of thermal methods (CFR 205.206(b) (5)), which includes "Flame, heat, or electrical means" to control weeds and other crop pests. Historically, thermal weed control has been accomplished through the use of propane fueled "flamers" and propane or diesel fueled "steamers." Early studies on the efficacy of thermal weeding methods recognized that it is not necessary (or desirable) to use combustion to control weeds. Instead, effective control of most weed species can be accomplished by heating the plant tissue to 100 c for 0.10 seconds. Heating plant tissue to this extent is sufficient to rupture cell walls in the target plant and interrupt photosynthesis; with death of the plant following in 2-3 days.

Propane flamers have been available commercially for decades, but are not in widespread use due to severe practical problems that include the following:

1. Safety—The transportation of liquid propane, its conversion from liquid to gas, and its open combustion in an uncontrolled agricultural environment create obvious safety hazards. Risks include burns and explosions (including the explosive potential created when propane torches flame out) Unintended fires are an additional hazard and, because open combustion is an unavoidable feature of this technology, propane flamers cannot be used in areas where burn bans are in effect.

2. Crop Safety—In order to create an environment that will heat target plants to the required 100 c, propane flamers need to operate at approximately 800-900 C. The ambient heat created by flamers is difficult to contain and is susceptible to drift created by even small amounts of air movement (whether convection created by the propane heat itself, or light winds). This lack of precision in targeting the necessary heat creates a hazard to the crop plants; especially given the fact that the areas most critical for weed control are invariably those closest to the crops.

3. Fuel Inefficiency—Open combustion of Propane is an expensive and inefficient heat source; especially in an outdoor environment. In addition it creates a significant environmental burden in the form of a high carbon load.

Steam weed control is a more recent technology, but it suffers from its own practical drawbacks:

1. Crop Safety—Although not as profoundly dangerous to crops as propane flamers, steamers suffer from the same difficulties in controlling their heat, limiting their heat to target weeds, and protecting crop plants from collateral damage.

2. Product Cost—Steamers, to the extent they exist as commercial products, tend to be far more complex and expensive than flamers.

3. Ineffectiveness—Most importantly, numerous studies have simply concluded that steamers provide ineffective weed control.

Electrically powered infrared heat may have the potential for wide-spread commercial applications in thermal weed control (for both organic and conventional crops). The authors perceive its advantages to include:

1. Relative safety for operators,
2. Relative fuel efficiency through the use of diesel generators,
3. Effectiveness and durability, 4. The ability to create intense heat—leading to further efficiencies in application speed, 5. The potential for effective weed control at far lower temperatures (given that plant tissue temperature, rather than ambient heat, is the critical factor determining effectiveness), 6. Targeted heat—reduced risks to crop plants, 7. Usable in a far wider range of weather conditions, and 8. Reduced fire hazards.

The first viable thermal weeding technology will capitalize on worldwide demand for a safe, sustainable method of weed control that (unlike conventional herbicides) is non-toxic, will never lose effectiveness due to weed resistance, and will be acceptable under organic production standards.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, will vary based upon the particular crops and weeds involved, and are deemed readily apparent and obvious to one skilled in the art, and all equivalent relationships to those illustrated in the drawings and described in the specification are intended to be encompassed by the present invention.

From a specific perspective, the primary and preferred embodiment of FIGS. 6-10 is a robot mounted electrically powered infrared based thermal weed control system 310 for heating weeds to an appropriate temperature and for an appropriate time sufficient to control weeds. The heating and the controlling are done in a safe, ecological, convenient, and economical manner. The system includes a robot 314 having a forward end 316 and a rearward end 318. One forward wheel 320 is adjacent to the forward end. Two laterally spaced rearward wheels 322 are adjacent to the rearward end. Two drive motors 324 are provided. One of the two drive motors is operatively coupled to each rearward wheel to propel the robot. A steering driver 326 operatively coupled to the front wheel.

An infrared emitter 330 is secured to the robot rearwardly of the forward wheel and forwardly of the rearward wheels. A silicone skirt 332 peripherally encompasses the infrared emitter, in other embodiments, the silicone skirt extends farther than shown, particularly such that the bottom edge thereof contacts the ground. The infrared emitter faces downwardly to irradiate ground and undesirable vegetation there below. In some embodiments, the undesired vegetation is heated to a temperature in excess of 100 degrees C. and for a duration of 10 seconds.

A directional assembly 336 includes an electrical wire 338 buried beneath the ground to a readable depth defining a path of travel over which the robot is to travel to pass over and irradiate and kill undesirable vegetation while abating future growth. The directional assembly includes a sensor 340 in the robot forwardly of the forward wheel. The sensor faces downwardly and follows the electrical wire and redirects the steering driver whereby the robot will move in a direction following the electrical wire.

The directional assembly 336 is shown in combination with wire 338, but it is understood that GPS sensors and/or other visual sensors can be used to determine where the vehicle should travel, and where the infrared should be used, to treat the undesirable vegetation.

A computer package 344 is in the robot. The computer package is operatively coupled to the drive motors and the steering driver and the infrared emitter to vary the speed of movement and the direction of movement and temperature of the infrared light emitter/target plant tissue.

A power assembly is within the robot. The power assembly includes a rechargeable battery 348. The rechargeable battery powers the drive motors and the directional driver and the infrared emitter and the computer package. The power assembly includes recharging nodes on the robot facing forwardly from the forward end. The recharging nodes are operatively coupled to the rechargeable battery. Lastly, a source of electrical potential 352 remote from the robot is adapted to receive the nodes of the robot to recharge the rechargeable battery as needed to insure powering of the system. In other embodiments, a generator is provided on the robot to drive the motors and provide electrical power to the robot.

Figure 12:
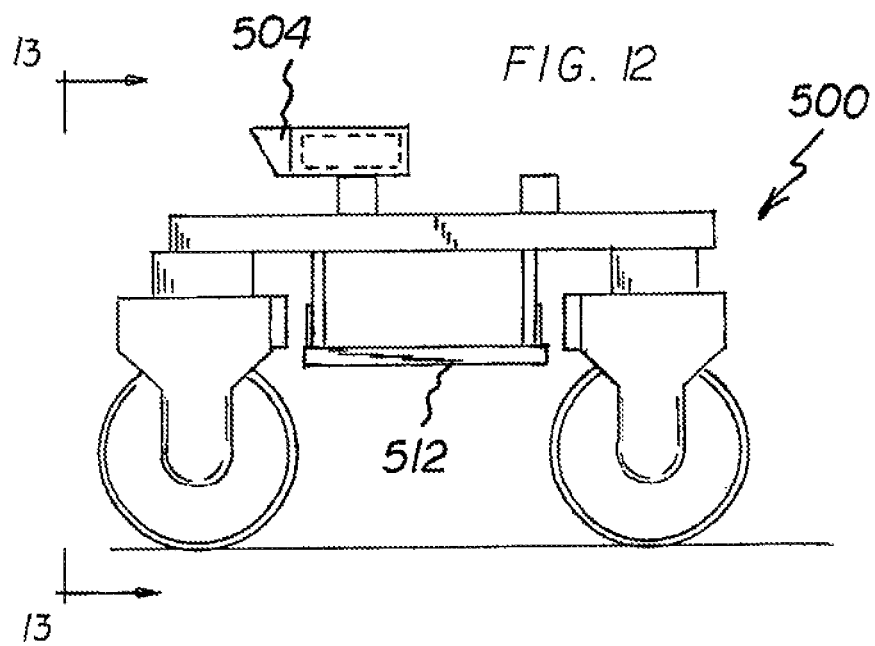
FIG. 12 is a side elevational view of another alternate embodiment of the invention.
Figure 13:
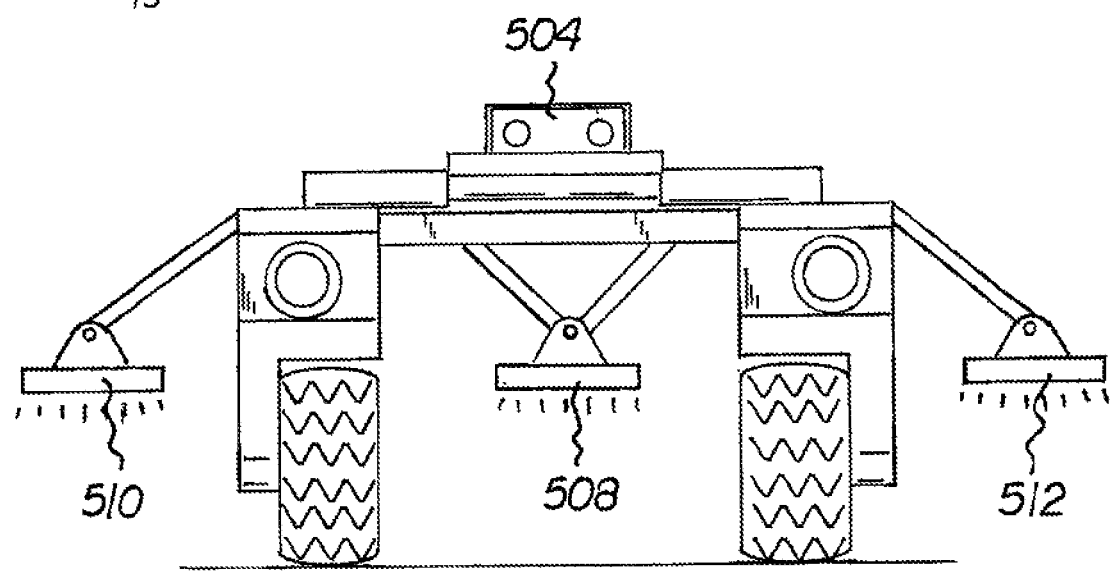
FIG. 13 is a front elevational view along line 13-13 of FIG. 12.
Figure 16:
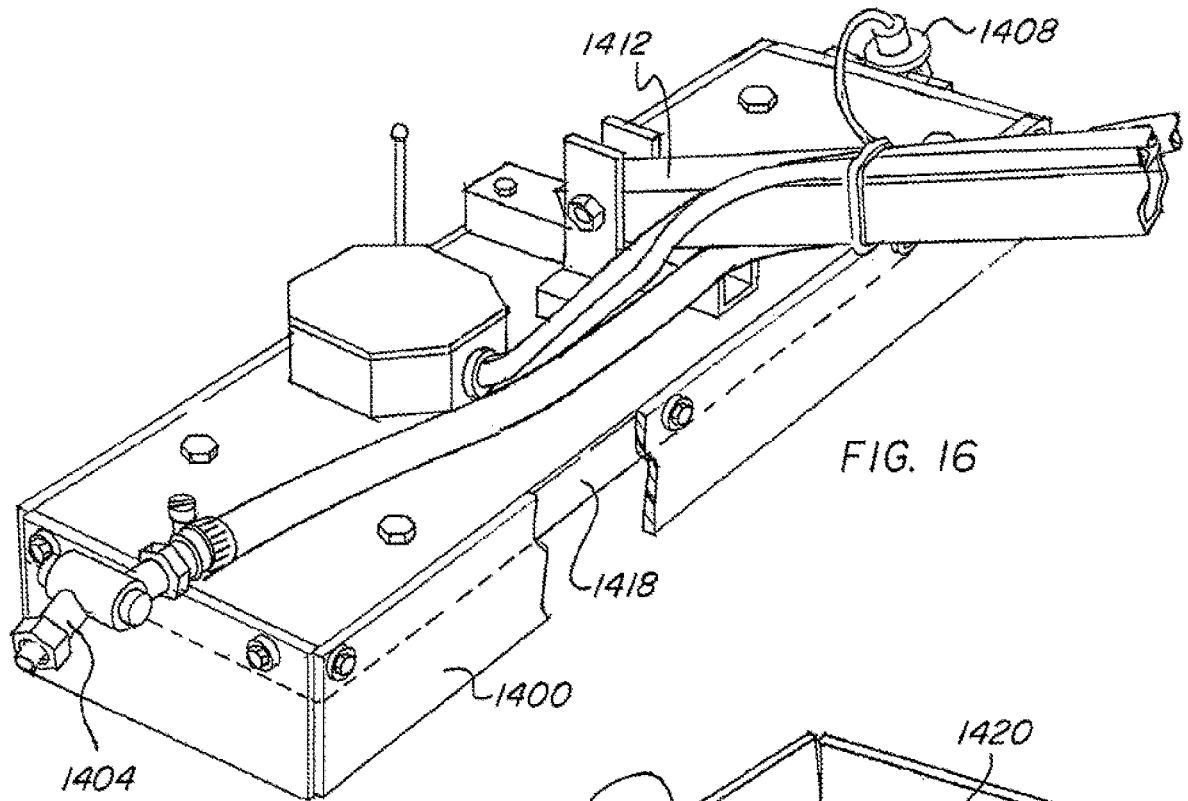
FIG. 16 is a top perspective view of FIG. 14
Figure 17:
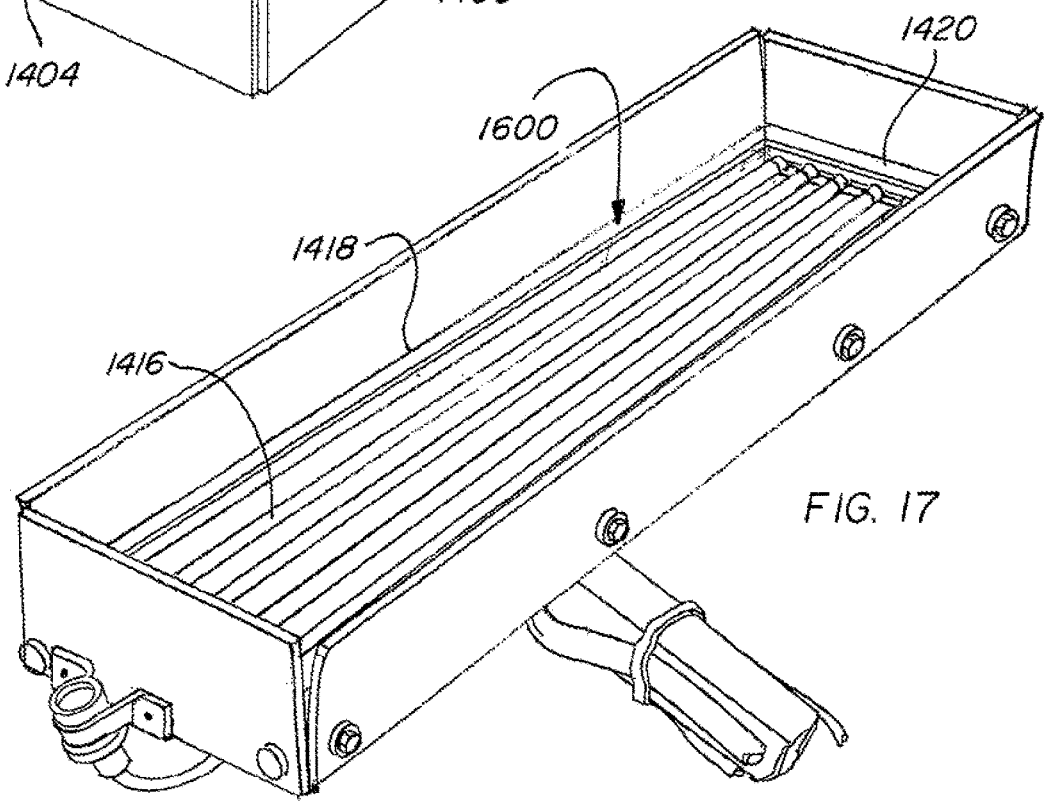
FIG. 17 is a bottom perspective view of FIG. 14

FIG. 11 illustrates an embodiment 400 wherein the infrared emitter 404 is in a U-shaped configuration located forwardly of the forward wheel and on opposite sides of the forward wheel. FIGS. 12 and 13 illustrate an embodiment 500 wherein the directional assembly includes a camera 504 and other sensors mounted upon the robot with a viewing station under the control of an operator to steer the robot appropriately. Additional sensors may include those such as radar, GPS, Sonar and the like. The robot may be autonomously piloted via GPS sensors and camera/radar. In the embodiment shown in FIG. 6 an underground wire is provided, however instead of a wire, the field may be provided with multiple reference points which can be located by the camera, radar or other sensors. For example, if the field is provided with three reference points at the edges thereof, the sensors are able to determine the position of the robot at any given time by determining the location of the relevant reference points. The robot and computer package are programmed with the row layout based on these reference points. Therefore, the robot will know where each row lies so that it can be navigated to control weeds in the appropriate manner. For example, when seeding is done, the seeding device may track where each seed or line of seeds are planted in reference to the three reference points, which would enable the robotic weed controller to know where it is relative to those rows. Example reference points 2000, 2002, 2004 are shown in in FIG. 18. Alternately or in addition to the reference points, GPS tracking and navigation based systems can be used in conjunction with the computer package and steering assembly to steer and drive the robot along the appropriate path.

In one robotic system, the infrared emitter includes a plurality of laterally spaced panels 508, 510, 512. As can be seen, the robot configuration in FIG. 13 is provided with high ground clearance that allows the robot to drive over multiple rows of crops without damaging the desirable crops.

Therefore, in one aspect a robot mounted electrically powered infrared based thermal weed control system is provided. A robot has a forward end and a rearward end, at least one forward wheel is adjacent to the forward end. At least one rearward wheel is adjacent to the rearward end. A drive motor propels the robot and a steering driver is operatively coupled to at least one of the wheels. An infrared emitter is secured to the robot facing downwardly to irradiate ground and undesirable vegetation there below. A directional assembly determines a path of travel over which the robot is to travel to pass over and irradiate and treat undesirable vegetation for the purpose of killing and controlling such vegetation and suppressing future weed growth.

In other aspects a directional assembly is provided including an electrical wire buried beneath the ground to a readable depth defining a path of travel over which the robot is to travel to pass over and irradiate and treat undesirable vegetation for the purpose of killing and controlling such vegetation and suppressing future growth. The directional assembly including a sensor in the robot forwardly of the forward wheel, the sensor facing downwardly and following the electrical wire and redirecting the steering driver whereby the robot will move in a direction following the electrical wire.

In other aspects, the directional assembly includes a sensor in the robot and a plurality of reference points located within the field, the reference points being tracked by the sensor to determine the relative position of the robot thereto. The computer package includes data indicative of a layout of desirable crops such that the computer package directs the robot between the desirable crops to control undesirable vegetation along such path.

in certain aspects, the robot includes two rearward wheels and one forward wheel. In other aspects the infrared emitter is located forwardly of the rearward wheels and rearwardly of the forward wheels. In other aspects, the infrared emitter is in a U-shaped configuration located forwardly of the forward wheel and on opposite sides of the forward wheel. In other aspects the directional assembly includes a camera mounted upon the robot with a viewing station under the control of an operator to steer the robot appropriately. In further aspects, the infrared emitter includes a plurality of laterally spaced panels which may be spaced to allow for treatment of multiple rows in one pass.

In yet another aspect robot mounted electrically powered infrared based thermal weed control system is provided for heating weeds to an appropriate temperature and for an appropriate time sufficient to control weeds, the heating and the controlling being done in a safe, ecological, convenient, and economical manner. The system includes a robot having a forward end and a rearward end, one forward wheel adjacent to the forward end. Two laterally spaced rearward wheels are adjacent to the rearward end. Two drive motors are provided with one of the two drive motors operatively coupled to each rearward wheel to propel the robot. A steering drive is provided and operatively coupled to the front wheel. NA an infrared emitter is secured to the robot rearwardly of the forward wheel and forwardly of the rearward wheels. A silicone skirt peripherally encompasses the infrared emitter and the emitter is spaced from the ground and facing downwardly. The emitter irradiates the ground and undesirable vegetation there below to a temperature in excess of 100 degrees C. for a duration of approximately 0.10 seconds. A directional assembly is provided including an electrical wire buried beneath the ground to a readable depth defining a path of travel over which the robot is to travel to pass over and irradiate and kill undesirable vegetation while abating future growth. The directional assembly includes a sensor in the robot forwardly of the forward wheel, the sensor facing downwardly and following the electrical wire and redirecting the steering driver whereby the robot will move in a direction following the electrical wire. A computer package is operatively coupled to the drive motors and the steering driver and the infrared emitter to vary the speed of movement and the direction of movement and degree of the infrared radiation emitted. A power assembly within the robot includes a rechargeable battery powering the drive motors, the directional driver and the infrared emitter, and the computer package. The robot further includes recharging nodes operatively coupled to the battery and a source of potential remote from the robot is adapted to receive the nodes of the robot to recharge the rechargeable battery as needed to insure powering of the system.

Referring to FIGS. 14-17, the housing 1500 is defined by sides 1418 and 1420. Chamber 1600 contains the emitter 1416. The emitter a width B' which results in an impact area B which is approximately the same width as B' Areas A and C represent the unaffected crops that are not directly under the emitter 1416. Thus, the emitter 1416 provides infrared radiation directly downwards at the undesirable crops found in the impact area B. As can be seen, the emitter width B' is approximately the same as the impact area width B. It is understood that the impact area can be slightly larger depending on the configuration and height of the emitter, but in the preferred implementation, the emitter generally creates a straight beam directed downwards at the crops. One example of such a beam is represented in FIG. 2.

Flexible skirt 1400 is attached around the outside of the housing 1500. In this case, the skirt 1400 is in four generally straight pieces. In operation, the skirt is designed to touch or be close to the ground and to flex to accommodate the variances in the ground. The emitter 1416 provides a generally straight beam of infrared radiation directly at the impact area B. The beam is generally of the same shape as housing 1500. Adjusting the height of the emitter 1416 over the ground can slightly change the width B of the impact area much in the way that a flashlight shines on a larger area when farther away, but a smaller area when closer. However, the housing 1500 and the configuration of the emitter 1416 provides a focused beam that is generally straight along its sides without significantly flaring out. Thus, the treatment area provides a focused area of treatment with infrared while not being significantly impacted by wind or drift that is unavoidable in combustion based systems.

The front of the housing 1500 includes a spray nozzle 1404 fed by a tube 1406 connected to a fluid reservoir. This nozzle 1404 delivers a spray of fluid ahead of the emitter. The fluid may simply be water or may include agricultural adjuvants or other materials that break the surface tension of the water to provide more even sheet coating of the water. In any event, the adjuvant fluid can increase the effectiveness of the infrared radiation on the undesired weeds. A temperature sensor 1408 measures the temperature of the treated area following treatment. Sensor 1415 monitors the temperature of the emitter 1416. The corresponding signals from sensors 1408 and 1415 are sent to the controller which allows for the electrical potential/power to be varied to provide the appropriate power to the emitter. As can be seen, the emitter is powered via wires 1414 connected to the source of electrical potential. In some embodiments, the source of electrical potential is a diesel or gas powered generator. In other cases, an alternator coupled to the vehicle provides the electrical potential. In still other embodiments, renewables such as wind or solar are used to provide electrical power, the wind and/or solar power may be coupled to a battery either within the vehicle or the vehicle may include a battery that is charged by wind/solar while the vehicle is not in use. The housing 1500 is mounted on arm 1412 which can be raised/lowered to allow for the height of the housing 1500 over the ground to be adjusted. As is understood, the controller may use the various sensor readings contemplated herein to adjust the power to the emitter and the speed/direction of the vehicle which carries the emitter.

Figure 18:
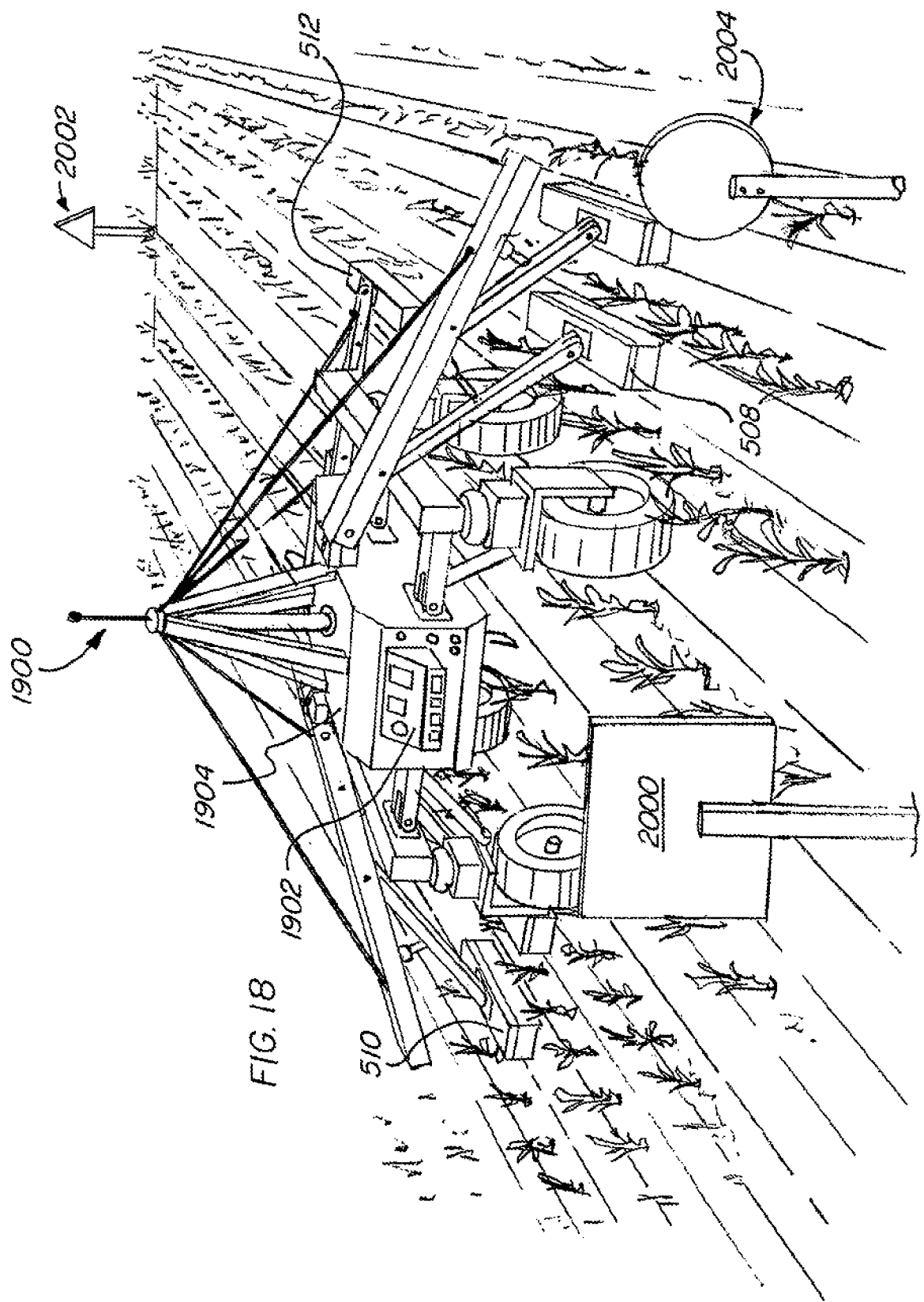
FIG. 18 is a perspective view of a robotic implementation of the present invention.

The robot of FIG. 18 includes a directional assembly 1900, 1902 which includes various sensors and computers to gather and process directional data. As can be seen, the sensor 1900 is elevated with respect to the robot such that reference points 2000, 2002 and 2004 can be tracked to determine the positioning of the robot. In alternate embodiments, GPS tracking can be used for the purposes of steering the robot. Furthermore, other sensors such as sonar, radar, camera and radio sensors can be used to determine the position of the robot and the infrared emitters relative to the rows of desirable crops. The field is mapped within the directional program executing on the computer of the robot to determine where treatment should be applied based on where desirable crops are planted. The electrical elements 508, 510, 512 are located on arms to enable multiple rows to be treated. The spaced elements are adjustable in their position both in terms of vertical height over the ground and distance apart and between each other. This enables the vehicle/robot to be configured differently for particular fields. It is further understood that although FIG. 18 shows a robotic embodiment, the vehicle could be human driven and include mapping displays and other data in the cab to enable the driver to treat the appropriate areas.

It is further understood that single emitter configurations of the earlier disclosed robots could be controlled in a similar manner. It is further understood that the sensor 1900 may include an antenna that enables the robot to receive and broadcast signals to a central or other remote computer that controls one or multiple robots or allows for the upload of the appropriate mapping data to enable to robots to automatically follow the designated paths and provide the weed treatment via infrared as described herein.

The computer of the robot is configured to execute a logic program based on various sensor readings to control the robot. It is further understood that the program could provide feedback in cab to a driver/operator in other embodiments. As one example, three key readings from the sensors can be used. These are, temperature of the treated ground (Tg), temperature of the emitter (Te) and Position (P). Further control parameters can be determined based on ambient temperature (Ta) as measured by another sensor or as determined via a remote weather station. Some examples of logic that can be implemented include if Tg is below a threshold level, Te is either increased or P is adjusted to slow the robot/vehicle down to provide more optimal weed killing. If Te cannot be increased, speed would be adjusted. Te may be either at an operational max or an optimized max. An operational max may be the maximum recommended sustained temperature of the emitter. The optimized max may be a value determined to optimize weed killing when accounting for costs of running the machine. This optimized max may be compared with the P max or the derivative thereof which would give speed. As it would be expected that an increase in speed would be more expensive in terms of moving the vehicle/robot. Ta may be used either as air temperature or ground temperature or both. If Ta measures ground temperature before treatment, Tg would then represent the temperature after treatment. In this case, the temperature difference required to kill the weeds would be known and the emitter power and speed of the vehicle/robot may be adjusted to enable the appropriate amount of heating. For example, if it is necessary to obtain 100 c on the treated weeds and the ambient temperature is 15 c a certain power/ speed combination to the emitter/speed controller would be necessary. If the ambient temperature is 19 c, it would be expected that the emitter can use less power or the speed can be faster or combinations thereof. In the implementation where the vehicle is manually controlled, the speed increases may be indicated to the driver or a cruise control type of mechanism may be used to obtain optimal speed as the driver pilots the vehicle along the appropriate path through the rows as shown in FIG. 18.

In addition, a solar powered robotic system with the electrically powered infrared emitter could spend much of the day re-charging internal batteries connected to a solar panel array. In some cases, the solar panels may be mounted to the robot itself and alternately, the robot may drive itself to a charging port connected to a solar array. When the sun goes down, the robot could be programmed to move through rows of crops to treat undesired weeds with the infrared radiation generated from the electrical infrared system Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A robotic thermal weed control system for the control of undesired vegetation without damaging desired crops, the robotic thermal weed control system comprising:
   (a) a robot having a forward end and a rearward end;
   (b) a housing carried by the robot, the housing having a chamber with an open side;
   (c) at least one electrically powered infrared heating element mounted within the chamber;
   (d) a source of electrical power carried by the robot and electrically coupled to the electrically powered infrared heating element; and
   (e) a control assembly carried by the robot for varying the electrical power to the electrically powered infrared heating element, wherein the electrically powered infrared heating element emits infrared radiation towards the undesired vegetation in a pattern to provide, at a speed of the robot, sufficient heating to impart a pre-emergent suppression of the undesired vegetation and control the undesired vegetation without combustion adjacent to the desired crops.

2. The robotic thermal weed control system of claim 1, wherein the pattern is a width of the electrically powered infrared heating element.

3. The robotic thermal weed control system of claim 1, wherein the infrared heating element creates a beam of infrared radiation directed at the ground.

4. The robotic thermal weed control system of claim 1, further comprising:
   (a) a directional assembly for determining a path of travel over which the robot passes;
   (b) at least one sensor on the robot, the sensor determining a state of the undesired vegetation; and
   (c) a computer on the robot connected to the at least one sensor and the control assembly, wherein the computer is configured to adjust the control assembly based on readings from the at least one sensor.

5. The robotic thermal weed control system of claim 4, further comprising a position sensor selected from the group consisting of: sonar, radar, camera, GPS, radio and combinations thereof.

6. The robotic thermal weed control system of claim 1, further comprising:

(a) at least one drive motor and at least one steering driver coupled to the robot;
(b) the steering driver configured to receive signals from the computer to adjust a path of travel of the robot;
(c) the at least one drive motor configured to move the robot; wherein the computer determines the path of travel based on readings from the at least one sensor.

7. The robotic thermal weed control system of claim 1, wherein the desired crops are free of damage from the pre-emergent suppression of the undesired vegetation and control of the undesired vegetation without combustion adjacent to the desired crops.

8. A robotic thermal weed control system for the controlling undesired vegetation without damaging desired crops, the robotic thermal weed control system comprising:
(a) a robot carrying a housing having a chamber with an open side;
(b) at least one electrically powered infrared heating element mounted within the chamber for emitting infrared radiation;
(c) a source of electrical power carried by the robot and electrically coupled to the electrically powered infrared heating element;
(d) a control assembly for varying the electrical power to the electrically powered infrared heating element for controlling undesired vegetation; and
(e) a temperature sensor measuring a temperature of at least one of the ground or the undesired vegetation following treatment by the electrically powered infrared heating element, wherein the controller adjusts at least one of the speed of the robot and the electrical power based on readings from the temperature sensor to provide a heating of the undesired vegetation in excess of 100° C. for a duration of 0.10 seconds.

9. The robotic thermal weed control system of claim 8, wherein the infrared radiation is emitted in a downward direction towards the undesired vegetation in a targeted pattern to provide heating to control the undesired vegetation without combustion adjacent to the desired crops.

10. The robotic thermal weed control system of claim 8, further comprising a nozzle fed by a source of fluid, the nozzle positioned to distribute a fluid on undesired vegetation positioned in a path of travel of the robot.

11. A robotic thermal weed control system for the control of undesired vegetation without damaging desired crops, the robotic thermal weed control system comprising:
(a) a robot having a front end and a rear end;
(b) a plurality of wheels connected to the robot;
(c) a drive motor operably connected to at least one of the wheels;
(d) a computer operably coupled to the drive motor;
(e) a power assembly carried by the robot, wherein the power assembly includes one of a rechargeable battery and a generator;
(f) a recharging node electrically connected to the power assembly;

(g) an electrically powered infrared heating element operably coupled to the computer and configured to emit infrared radiation to intersect the undesired vegetation; and
(h) wherein the computer is configured to expose the path to the robot to provide a heating to impart a pre-emergent suppression of the undesired vegetation and control the undesired vegetation without combustion.

12. The robotic thermal weed control system of claim 11, further comprising:
(a) at least one sensor on the robot, wherein the at least one sensor is coupled to the computer and the computer is configured to adjust the electrically powered infrared heating element based on readings from the at least one sensor.

13. The robotic thermal weed control system of claim 11, further comprising:
(a) a steering driver connected to the computer and configured to receive signals from the computer to adjust a path of travel of the robot;
(c) at least one sensor on the robot, wherein the computer determines a path of travel based on readings from the at least one sensor.

14. A robotic thermal weed control system for the controlled undesired vegetation without damaging desired crops, the robotic thermal weed control system comprising:
(a) a robot having a forward end and a rearward end;
(b) a housing carried by the robot, the housing having a chamber with an open side;
(c) at least one electrically powered infrared heating element mounted within the chamber;
(d) a source of electrical power carried by the robot and electrically coupled to the electrically powered infrared heating element;
(e) at least one sensor on the robot, the sensor determining a state of the undesired vegetation;
(f) a computer on the robot connected to the at least one sensor, wherein the computer is configured to adjust the electrically powered infrared heating element based on readings from the at least one sensor to impart a pre-emergent suppression of the undesired vegetation and control the undesired vegetation without combustion; and
(g) a directional assembly for directing the robot at an application speed.

15. The robotic thermal weed control system of claim 14, further comprising:
(a) at least one steering driver carried by the robot and coupled to the computer, the steering driver configured to receive signals from the computer to adjust a path of travel of the robot; and
(b) at least one drive motor carried by the robot; the at least one drive motor configured to move the robot.

16. The robotic thermal weed control system of claim 14, wherein the position sensor is selected from the group consisting of: sonar, radar, camera, GPS, radio and combinations thereof.

* * * * *